US010370206B2

(12) United States Patent
Giannatti

(10) Patent No.: US 10,370,206 B2
(45) Date of Patent: Aug. 6, 2019

(54) LOADING RAMP

(71) Applicant: Winston Products, LLC, Cleveland, OH (US)

(72) Inventor: Nick D. Giannatti, Hudson, OH (US)

(73) Assignee: WINSTON PRODUCTS LLC, Cleveland, OH (US)

( * ) Notice: Subject to any disclaimer, the term of this patent is extended or adjusted under 35 U.S.C. 154(b) by 164 days.

(21) Appl. No.: 15/452,292

(22) Filed: Mar. 7, 2017

(65) Prior Publication Data

US 2017/0253445 A1 Sep. 7, 2017

Related U.S. Application Data

(60) Provisional application No. 62/304,721, filed on Mar. 7, 2016.

(51) Int. Cl.
*E01D 1/00* (2006.01)
*B65G 69/30* (2006.01)
*B65G 69/28* (2006.01)

(52) U.S. Cl.
CPC .......... *B65G 69/30* (2013.01); *B65G 69/2811* (2013.01)

(58) Field of Classification Search
CPC ..... E05D 11/06; E05D 11/10; E05D 11/1014; B65G 69/30; B65G 69/2811; B66F 7/243; A61G 3/061
USPC .................... 14/69.5; 33/459, 463, 465–473, 33/495–496; 16/374
See application file for complete search history.

(56) References Cited

U.S. PATENT DOCUMENTS

| | | | |
|---|---|---|---|
| 1,357,607 A | | 11/1920 | Behrens et al. |
| 1,594,097 A | * | 7/1926 | Histand ................ G01B 33/563 33/465 |
| 1,706,919 A | * | 3/1929 | Ericson ................... B66F 7/243 254/88 |
| 3,958,335 A | * | 5/1976 | Arnold ..................... B23Q 1/28 269/81 |
| 4,120,485 A | * | 10/1978 | McConnell ............. B66F 7/243 254/88 |
| D264,199 S | | 5/1982 | Wood |
| 4,520,802 A | * | 6/1985 | Mercer ................. A61F 5/0123 602/16 |

(Continued)

FOREIGN PATENT DOCUMENTS

| | | |
|---|---|---|
| CA | 2531475 | 6/2007 |
| JP | 2013-47448 | 3/2013 |
| JP | 2014124495 | 7/2014 |

OTHER PUBLICATIONS

The International Search Report and The Written Opinion of the International Searching Authority—PCT/US17/21151 dated Jun. 1, 2017.

*Primary Examiner* — Thomas B Will
*Assistant Examiner* — Katherine J Chu
(74) *Attorney, Agent, or Firm* — Tucker Ellis LLP

(57) ABSTRACT

Provided is a loading ramp having two or more ramp portions having progressively decreasing widths and each defining a recessed spaced. The loading ramp has an extended position where the two or more ramp portions are parallel to one another or angled relative to one another, and a folded position where one or more ramp portions are nested within another of the ramp portions such that the one or more ramp portions are disposed in the recessed spaced of the another ramp portion.

20 Claims, 22 Drawing Sheets

(56) References Cited

U.S. PATENT DOCUMENTS

| | | | | |
|---|---|---|---|---|
| 4,628,561 A * | 12/1986 | Kushniryk | ............ | B65G 69/287 14/69.5 |
| 4,779,298 A | 10/1988 | Nichols, Sr. et al. | | |
| 5,038,765 A * | 8/1991 | Young | .................... | A61F 5/0123 602/16 |
| 5,137,114 A * | 8/1992 | Yde | ....................... | E04F 11/002 14/71.1 |
| 5,475,931 A * | 12/1995 | Wei | ........................ | B43K 31/00 33/471 |
| 5,661,875 A * | 9/1997 | Overcash | ................ | E05D 11/06 16/375 |
| 5,662,596 A * | 9/1997 | Young | ................... | A61F 5/0123 602/16 |
| 5,933,898 A * | 8/1999 | Estes | ...................... | B65G 69/30 14/69.5 |
| 6,330,751 B1 * | 12/2001 | Seaman | ................... | B25H 7/00 33/465 |
| 6,430,769 B1 * | 8/2002 | Allen | ...................... | A61G 3/061 14/69.5 |
| 6,431,815 B1 | 8/2002 | Zarzecki et al. | | |
| 6,536,064 B1 * | 3/2003 | Swink | ...................... | B60P 1/431 14/69.5 |
| 6,722,721 B2 * | 4/2004 | Sherrer | ................... | B60P 1/435 14/71.1 |
| 6,732,410 B1 * | 5/2004 | Nedderman, Jr. | ........ | E05F 5/02 16/371 |
| 6,868,574 B2 | 3/2005 | Schomaker et al. | | |
| 7,082,637 B1 | 8/2006 | Griffin | | |
| 7,100,232 B2 | 9/2006 | Zhang | | |
| 7,350,255 B2 | 4/2008 | Zhang | | |
| D599,062 S * | 8/2009 | Jakubowski | ................. | D30/199 |
| 8,132,455 B2 * | 3/2012 | Chen | ...................... | G01F 1/692 73/204.26 |
| 8,820,340 B2 * | 9/2014 | Hughes | ................... | E04H 15/50 135/131 |
| 9,221,631 B2 | 12/2015 | Breeden, III et al. | | |
| 9,919,754 B2 * | 3/2018 | Chamoun | ................. | B60P 1/43 |
| 2003/0000980 A1 | 1/2003 | Muizelaar et al. | | |
| 2003/0015885 A1 | 1/2003 | Landwehr | | |
| 2003/0145398 A1 | 8/2003 | Schomaker et al. | | |
| 2006/0117502 A1 * | 6/2006 | Lensing | ................. | B65G 69/30 14/69.5 |
| 2006/0214455 A1 | 9/2006 | Aulicino | | |
| 2009/0233740 A1 * | 9/2009 | Gensler | ............. | A63B 69/0002 473/497 |
| 2012/0297558 A1 | 11/2012 | Wang et al. | | |
| 2015/0013081 A1 | 1/2015 | Breeden, III et al. | | |

* cited by examiner

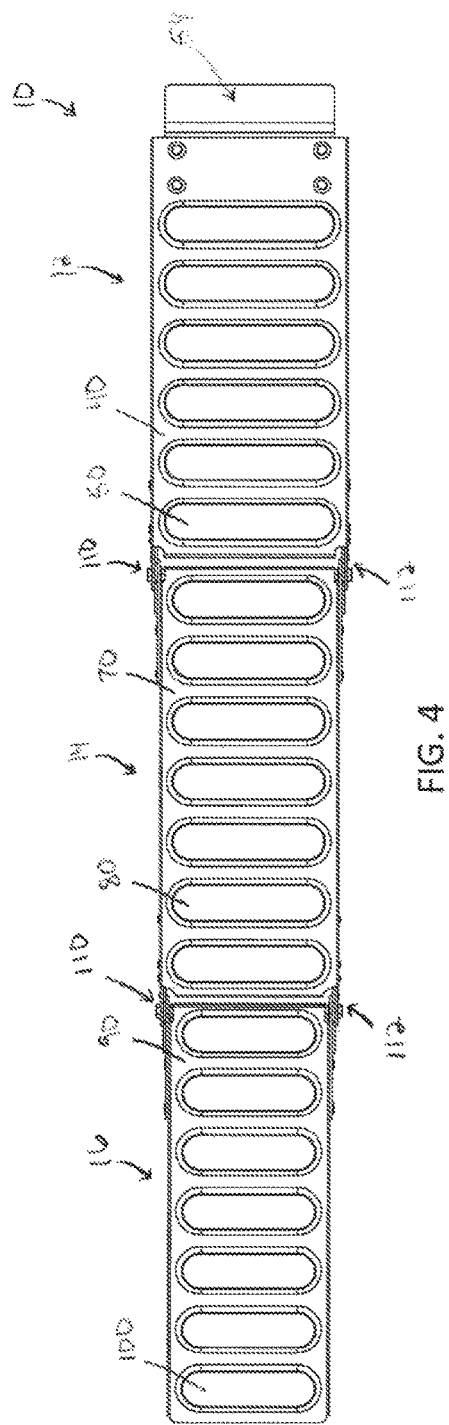

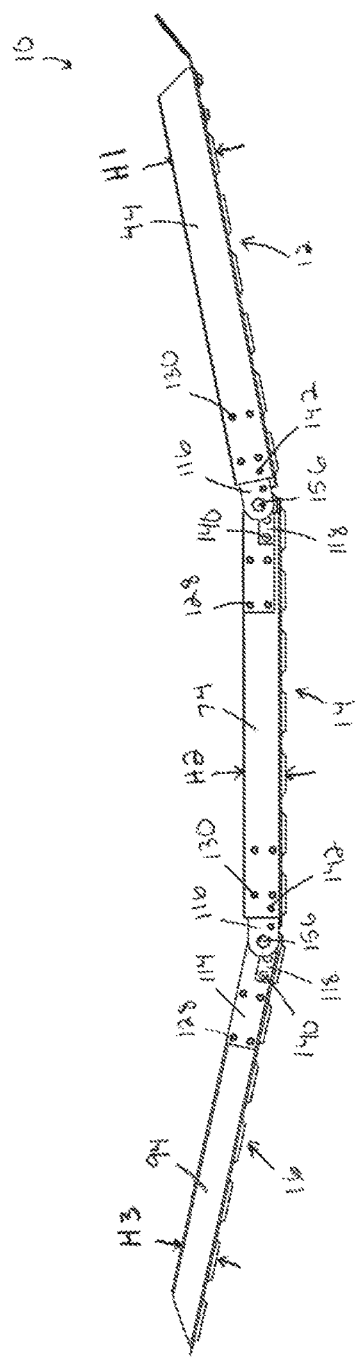

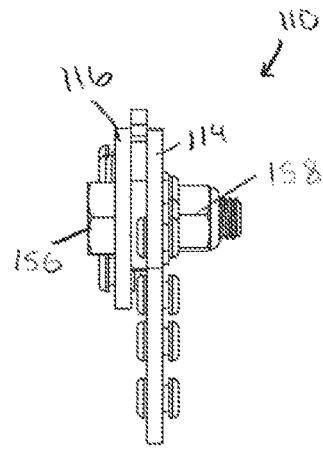 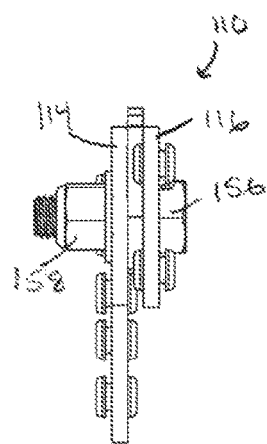
FIG. 16  FIG. 17
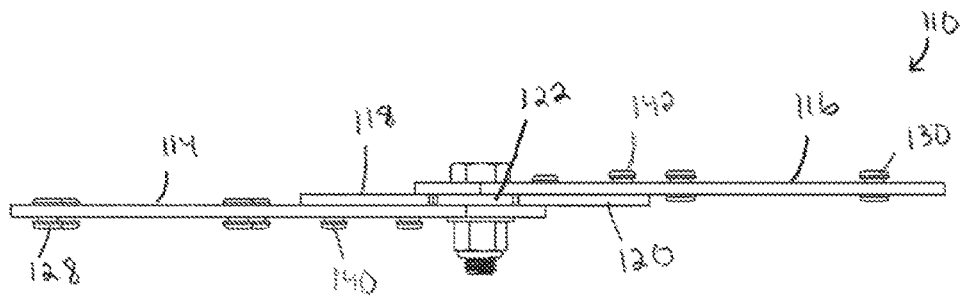
FIG. 18
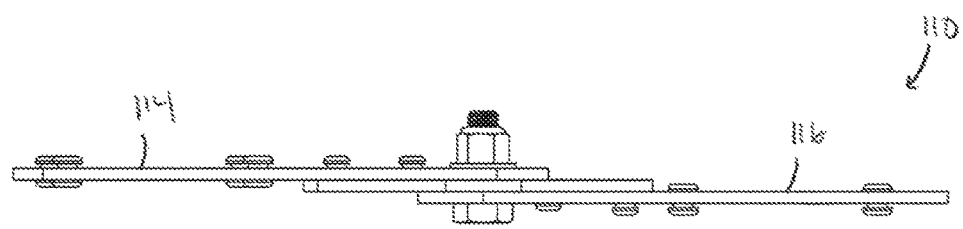
FIG. 19

LOADING RAMP

RELATED APPLICATIONS

This application claims the benefit of U.S. Provisional Application No. 62/304,721 filed Mar. 7, 2016, which is hereby incorporated herein by reference.

FIELD OF INVENTION

The present invention relates generally to ramps, and more particularly to folding loading ramps.

BACKGROUND

A loading ramp can be used to support one or more objects. For example, a loading ramp can support a vehicle, snowmobile, motorcycle, etc. The loading ramp can be positioned to extend between a first surface and a second surface. As such, the vehicle can be moved from the first surface to the second surface by moving across/over the loading ramp. Loading ramps can be relatively long in length and may be cumbersome when stored/stowed. Furthermore, loading ramps are sometimes needed to support a relatively heavy weight, such as the heavy weights associated with vehicles.

SUMMARY OF INVENTION

The present application provides a loading ramp having two or more ramp portions having progressively decreasing widths and each defining a recessed spaced. The loading ramp has an extended position where the two or more ramp portions are parallel to one another or angled relative to one another, and a folded position where one or more ramp portions are nested within another of the ramp portions such that the one or more ramp portions are disposed in the recessed spaced of the another ramp portion. In this way the ramp minimizes storage space required and makes transportation of the ramp easier.

According to an aspect, a loading ramp includes a first ramp portion having first and second ends and a first width, the first ramp portion defining a first recessed space, a second ramp portion having first and second ends and a second width less than the first width, the second ramp portion defining a second recessed space, and first and second hinge assemblies each coupled to the first ramp portion at the second end and to the second ramp portion at the first end to pivotally connect the first ramp portion and the second ramp portion, wherein the loading ramp has an extended position and a folded position where the second ramp portion is nested within the first ramp portion such that the second ramp portion is disposed in the first recessed space.

According to another aspect, a loading ramp includes a first ramp portion having a first width and defining a first recessed space, a second ramp portion having a second width less than the first width and defining a second recessed space, a third ramp portion having a third width less than the second width and defining a third recessed space, first and second hinge assemblies coupled to the first ramp portion and the second ramp portion to pivotally connect the first ramp portion and the second ramp portion, and third and fourth hinge assemblies coupled to the second ramp portion and the third ramp portion to pivotally connect the second ramp portion and the third ramp portion, wherein the loading ramp has an extended position and a folded position where the third ramp portion is nested within the second ramp portion such that the third ramp portion is disposed in the second recessed space, and the second and third ramp portions are nested within the first ramp portion such that the second and third ramp portions are disposed in the first recessed space.

According to still another aspect, a loading ramp includes a first ramp portion having a first width and defining a first recessed space, a second ramp portion pivotally coupled to the first ramp portion and having a second width less than the first width and defining a second recessed space, and a third ramp portion pivotally coupled to the second ramp portion and having a third width less than the second width and defining a third recessed space, wherein the loading ramp has an extended position and a folded position where the third ramp portion is nested within the second ramp portion such that the third ramp portion is disposed in the second recessed space, and the second and third ramp portions are nested within the first ramp portion such that the second and third ramp portions are disposed in the first recessed space.

The foregoing and other features of the application are described below with reference to the drawings.

BRIEF DESCRIPTION OF THE DRAWINGS

FIG. 4 is a top view of the loading ramp.
FIG. 5 is a bottom view of the loading ramp.
FIG. 6 is a left side view of the loading ramp.
FIG. 7 is a right side view of the loading ramp.
FIG. 16 is a front view of the hinge assembly.
FIG. 17 is a rear view of the hinge assembly.
FIG. 18 is a top view of the hinge assembly.
FIG. 19 is a bottom view of the hinge assembly.

DETAILED DESCRIPTION

The principles of the present application relate to a loading ramp, such as a folding loading ramp for use with vehicles and trailers, and thus will be described below in this context. It will be appreciated that the principles of the application may be applicable to other ramp applications, ladders, etc.

Figure 1:
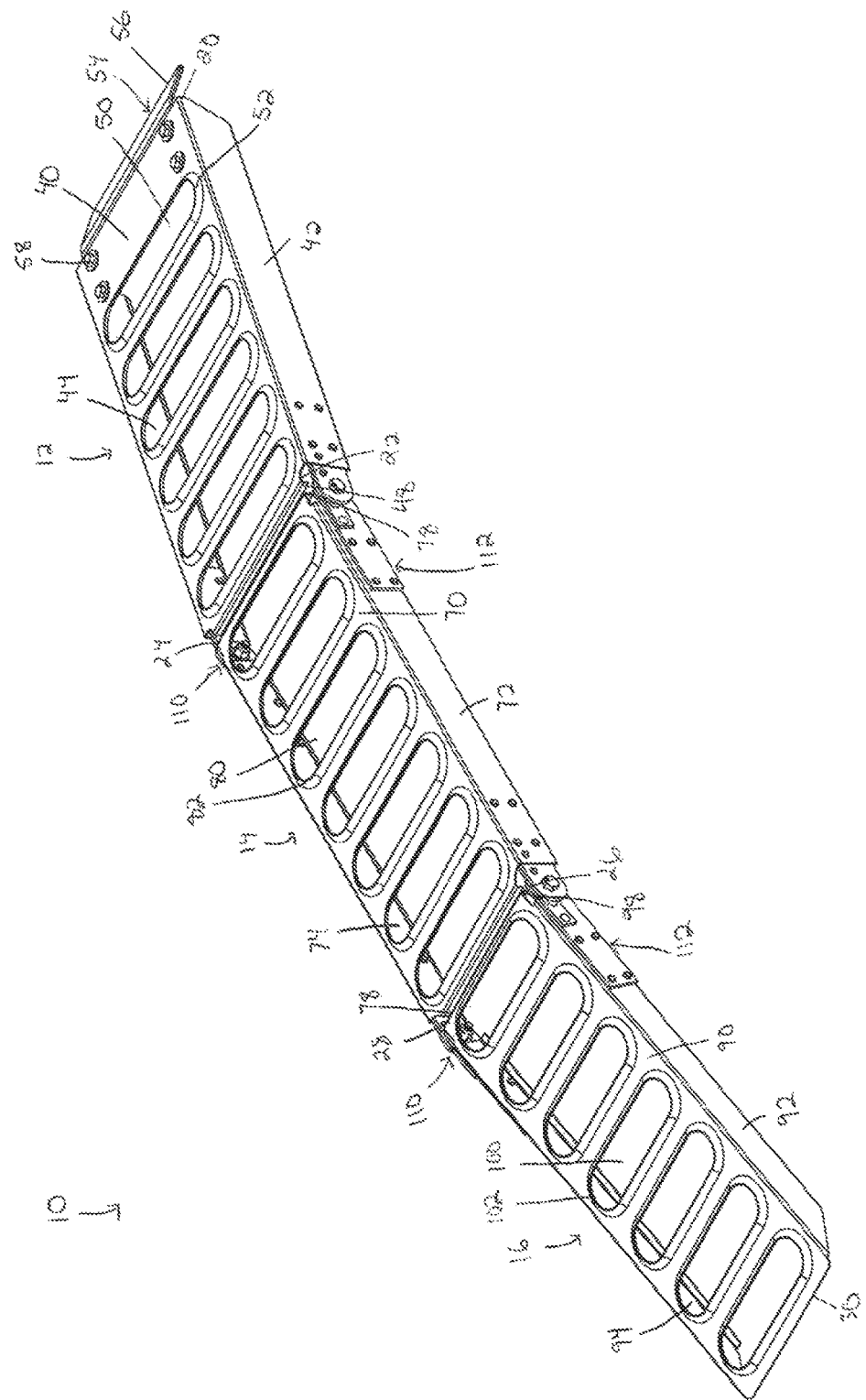
FIG. 1 is a perspective view of an exemplary loading ramp in an extended position.
Figure 2:
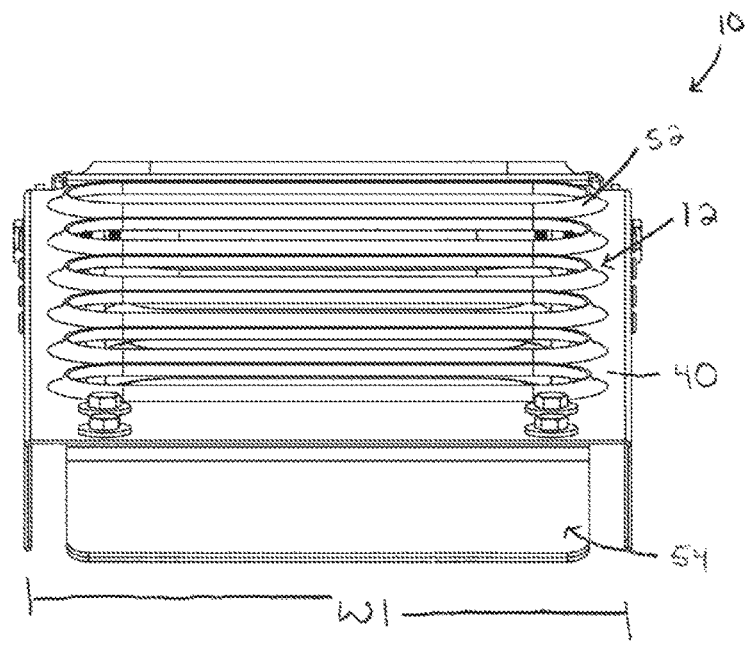
FIG. 2 is a front view of the loading ramp.
Figure 3:
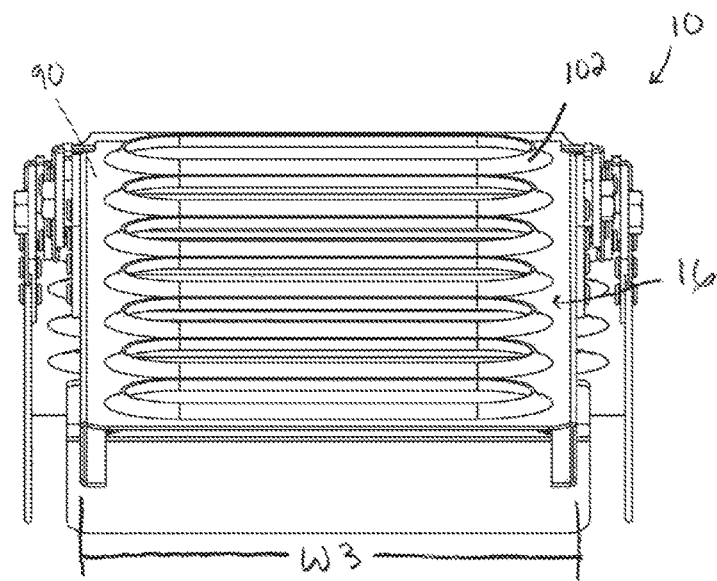
FIG. 3 is a rear view of the loading ramp.
Figure 8:
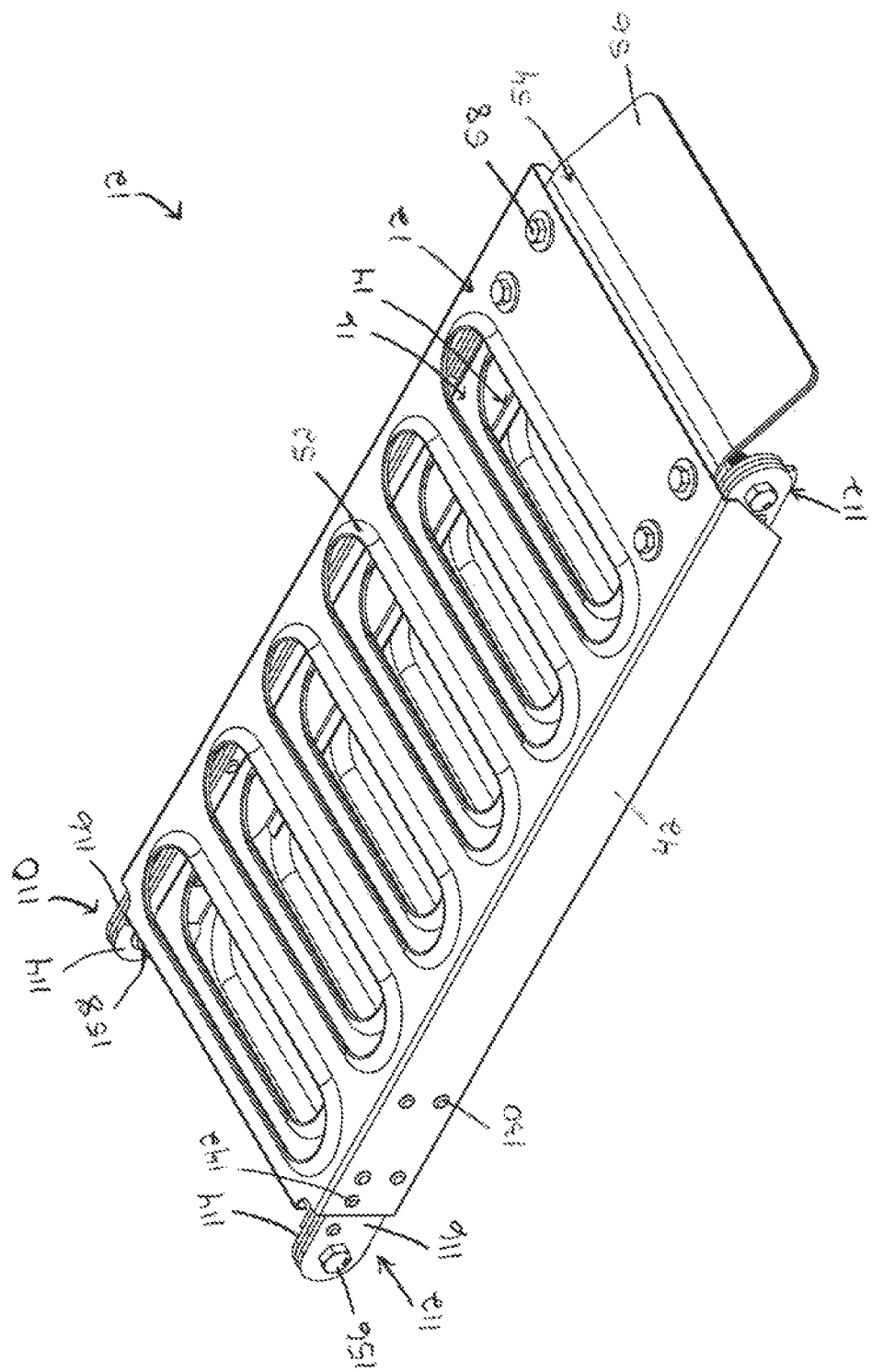
FIG. 8 is a perspective view of the loading ramp in a folded position.
Figure 9:
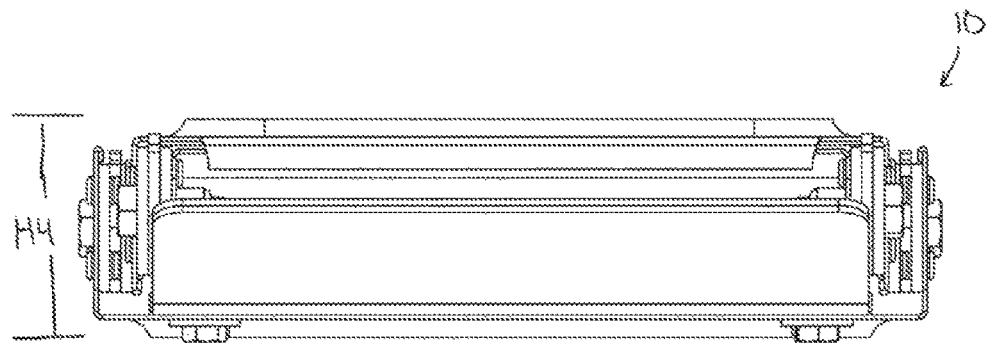
FIG. 9 is a front view of the loading ramp.
Figure 10:
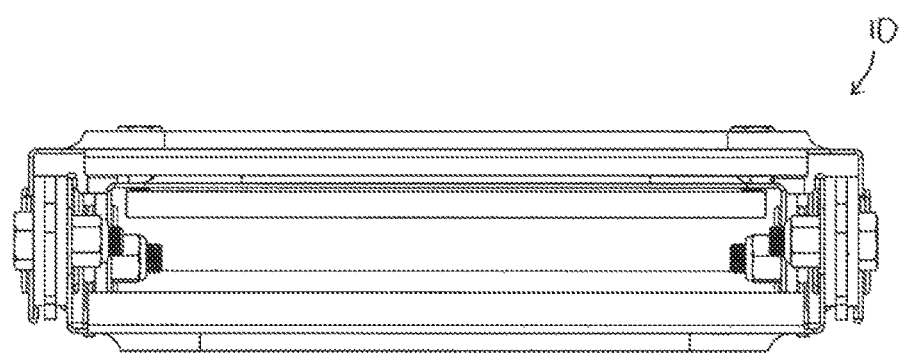
FIG. 10 is a rear view of the loading ramp.
Figure 11:
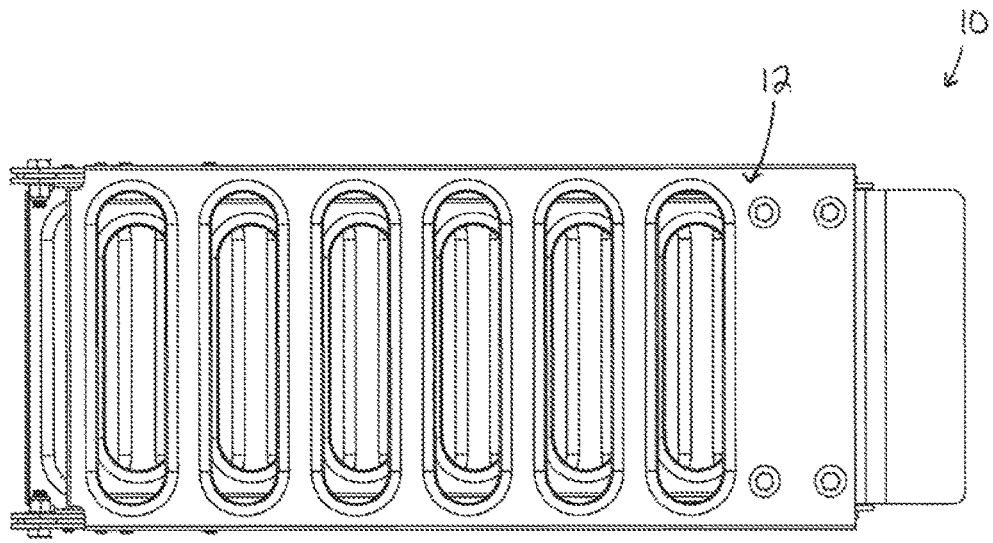
FIG. 11 is a top view of the loading ramp.
Figure 12:
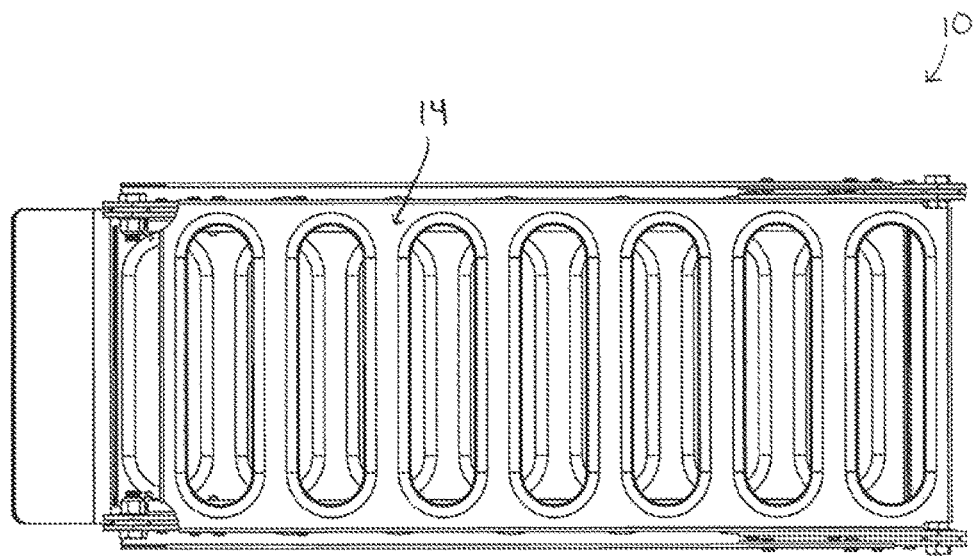
FIG. 12 is a bottom view of the loading ramp.
Figure 13:
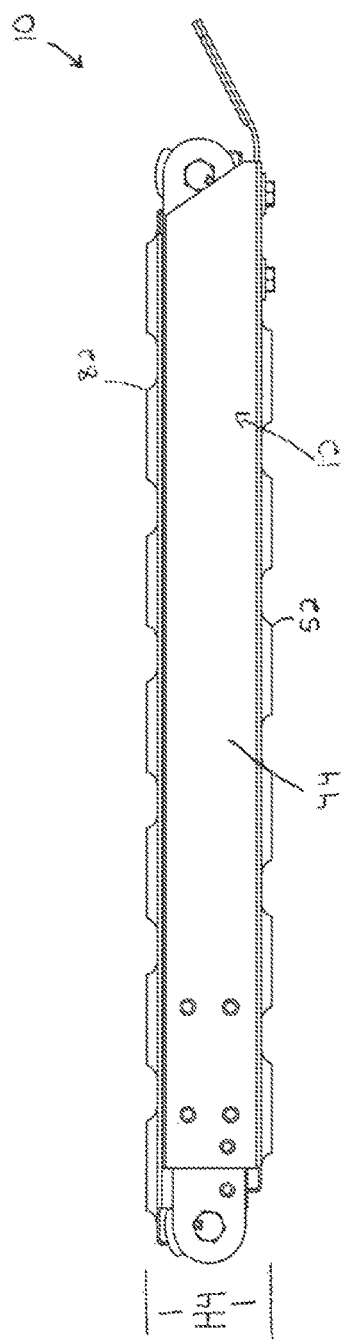
FIG. 13 is a left side view of the loading ramp.
Figure 14:
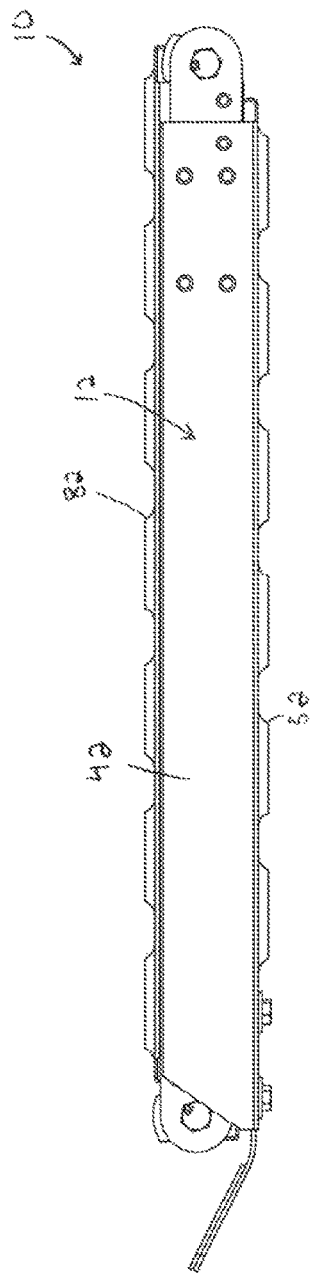
FIG. 14 is a right side view of the loading ramp.
Figure 15:
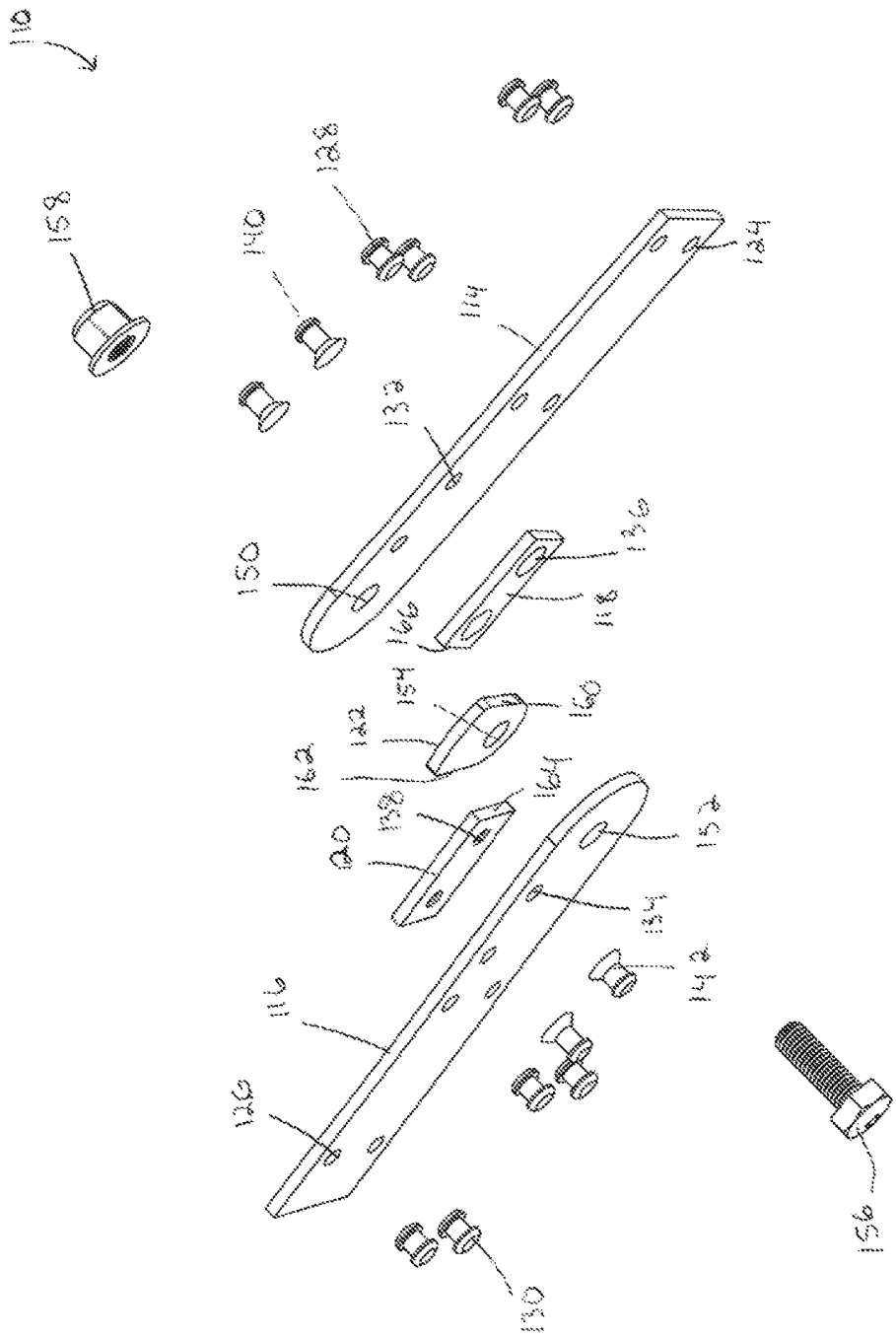
FIG. 15 is an exploded view of an exemplary hinge assembly of the loading ramp.
Figure 20:
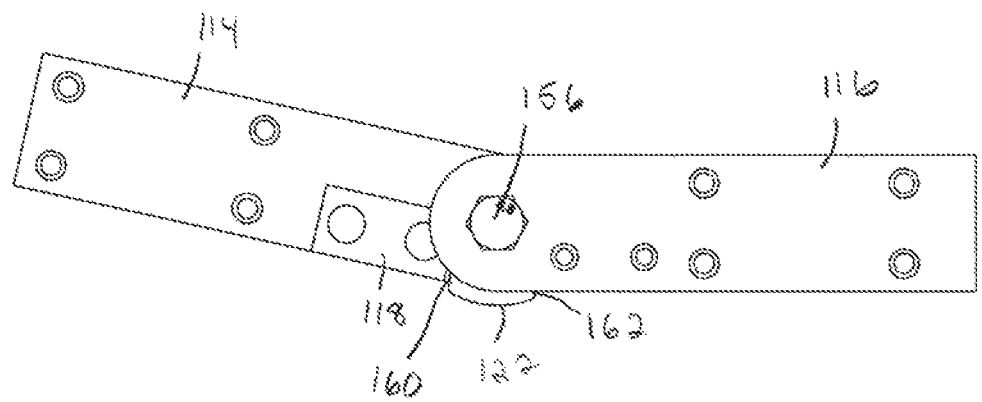
FIG. 20 is a left side view of the hinge assembly.
Figure 21:
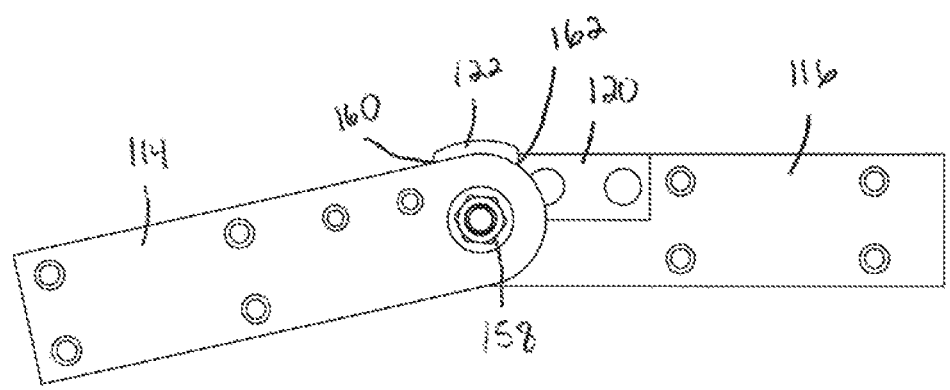
FIG. 21 is a right side view of the hinge assembly.

Turning now to FIG. 1, a loading ramp is illustrated generally at reference numeral 10. The loading ramp 10 is shown as a tri-fold ramp that includes a first ramp portion 12, a second ramp portion 14 connected to the first ramp portion 12, and a third ramp portion 16 connected to the second ramp portion 14. Each ramp portion 12, 14, 16 has first and second ends 20 and 22, 24 and 26, and 28 and 30, respectively, where the first end 24 of the second ramp portion 14 is adjacent the second end 22 of the first ramp portion 12 and the second end 26 of the second ramp portion 14 is adjacent the first end 28 of the third ramp portion 16. The first ramp portion 12 is configured to be supported on a first surface at the first end 20, such as an elevated surface, such as a vehicle surface, and the third ramp portion 16 is configured to be supported on a second surface lower than the first surface at the second end 30, such as a ground surface.

The first ramp portion 12 has a first width W1 and a first height H1, the second ramp portion 14 has a second width W2 less than the first width and a second height H2, and the third ramp portion 16 has a third width W3 less than the second width and a third height H3. In an embodiment, the second height H2 is less than or equal to the first height H1, and the third height H3 is less than or equal to the second height H2. In another embodiment, the second height H2 is less than the first height H1 and the third height H3 is less than the second height H2.

The first ramp portion 12 includes a deck 40 extending longitudinally and first and second sides 42 and 44 extending downward from sides of the deck 40 perpendicular to the deck 40. The deck 40 and the first and second sides 42 and 44 may be integrally formed and form a recessed space 46 for receiving the second and third ramp portions 14 and 16. The first ramp portion 12 can also include a downwardly bent end 48 at the second end 22 integrally formed with the deck 40 that acts as a strengthening member and eliminates a sharp edge.

The deck 40 includes one or more openings 50 that may have any suitable shape, such as a pill shape, and which each have an upward extending ridge 52 that acts as a friction element, for example for providing friction to a vehicle tire. Attached to the deck 40 at the first end 20 is an end plate 54 having a lip portion 56 that projects outwardly away from the first end 20 and at an angle to the deck 40 to engage the first surface. The end plate 54 may be attached to the deck 40 in any suitable manner, such as by fasteners 58.

Similar to the first ramp portion 12, the second ramp portion 40 includes a deck 70 extending longitudinally and first and second sides 72 and 74 extending downward from sides of the deck 70 perpendicular to the deck 70. The deck 70 and the first and second sides 72 and 74 may be integrally formed and form a recessed space 76 for receiving the third ramp portion 16. The second ramp portion 14 can also include a downwardly bent end 78 at the first and second end 24 and 26 integrally formed with the deck 70 that act as strengthening members and eliminate sharp edges. The deck 70 includes one or more openings 80 that may have any suitable shape, such as a pill shape, and which each have an upward extending ridge 82 that acts as a friction element.

Similar to the first and second ramp portions 12 and 14, the third ramp portion 16 includes a deck 90 extending longitudinally and first and second sides 92 and 94 extending downward from sides of the deck 90 perpendicular to the deck 90. The deck 90 and the first and second sides 92 and 94 may be integrally formed and form a recessed space 96. The third ramp portion 16 can also include a downwardly bent end 98 at the first end 28 integrally formed with the deck 90 that acts as a strengthening member and eliminates a sharp edge, and the ends of the first and second sides 92 and 94 may be angled at the second end 30, such as a chamfer, to rest against the second surface. Alternatively, an end plate may be attached to the deck 90 to rest against the second surface. The deck 90 includes one or more openings 100 that may have any suitable shape, such as a pill shape, and which each have an upward extending ridge 102 that acts as a friction element.

Figure 41:
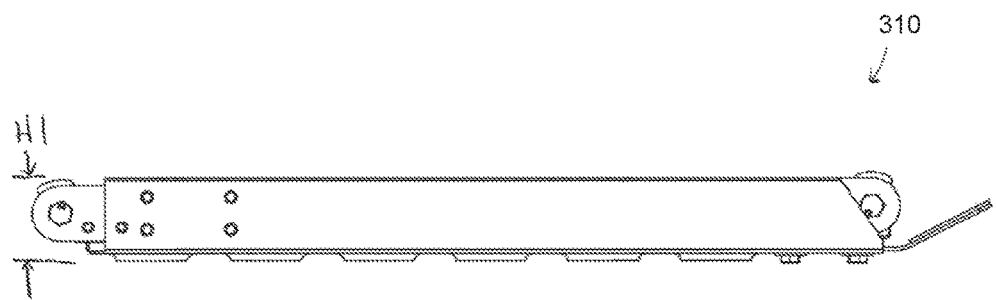
FIG. 41 is a left side view of still another loading ramp in a folded position.
Figure 42:
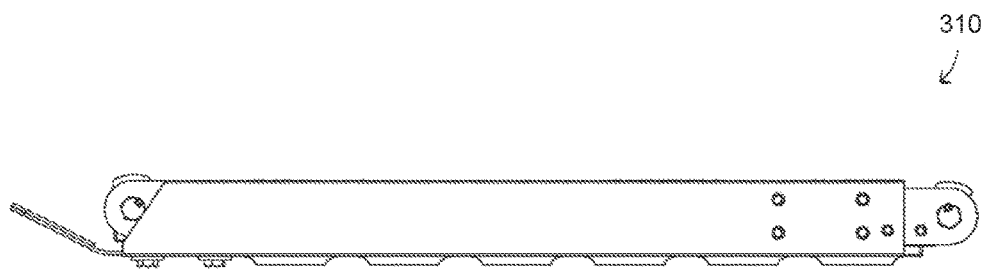
FIG. 42 is a right side view of the folding ramp of FIG. 41.

The first ramp portion 12 is connected to the second ramp portion 14 by first and second hinge assemblies 110 and 112, and the second ramp portion 14 is connected to the third ramp portion 16 by first and second hinge assemblies 110 and 112. The first and second hinge assemblies 110 and 112 allow the ramp 20 to move between an extended position shown in FIGS. 1-7 and a folded position, otherwise referred to as a nested position, shown in FIGS. 8-14. When extended, the ramp portions 12, 14, and 16 are angled relative to one another or substantially coplanar to one another. When nested, a combined height H4 of the ramp portions 12, 14, and 16 will be similar to the height H1 of the first ramp portion 12 to minimize storage space required when storing the ramp 10 and to make transportation of the ramp easier. For example, when nested, the combined height H4 is greater than the first height H1 and less than one and one third the first height H1. In an embodiment, the combined height H4 is greater than the first height H1 and less than one and one sixth the first height H1. In another embodiment of a ramp 310, as shown in FIGS. 41 and 42, which is substantially the same as the ramp 10 and thus the same reference numbers and description are equally applicable except as noted below, the second and third ramp portions 14 and 16 are completely disposed within the recessed space 46 such that the combined height H4 is equal to the first height H1.

Figure 22:
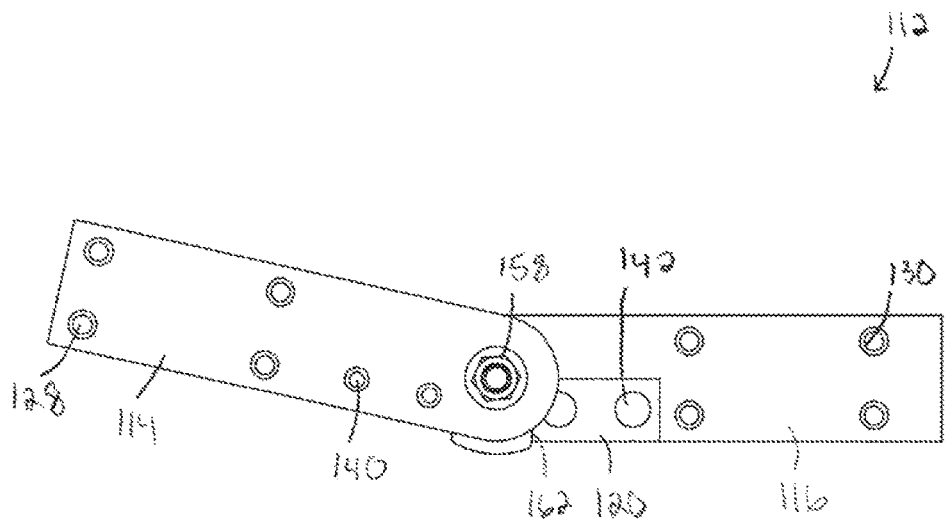
FIG. 22 is a left side view of another hinge assembly of the loading ramp.
Figure 23:
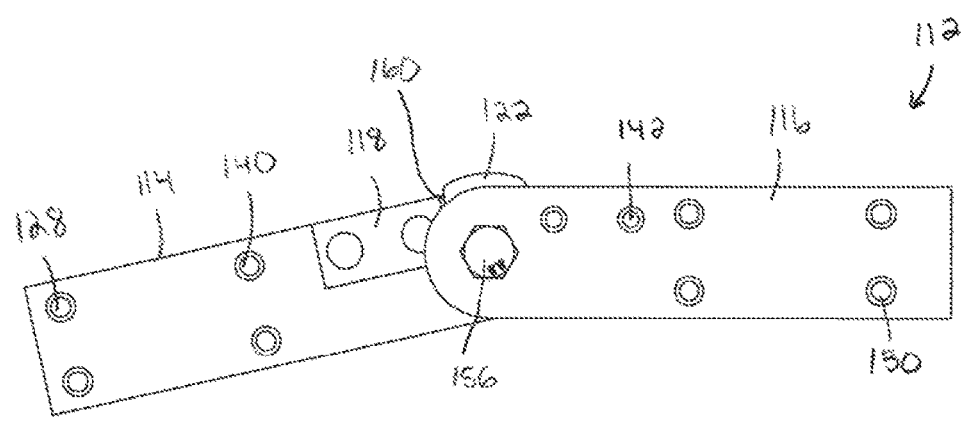
FIG. 23 is a right side view of the hinge assembly of FIG. 22.
Figure 24:
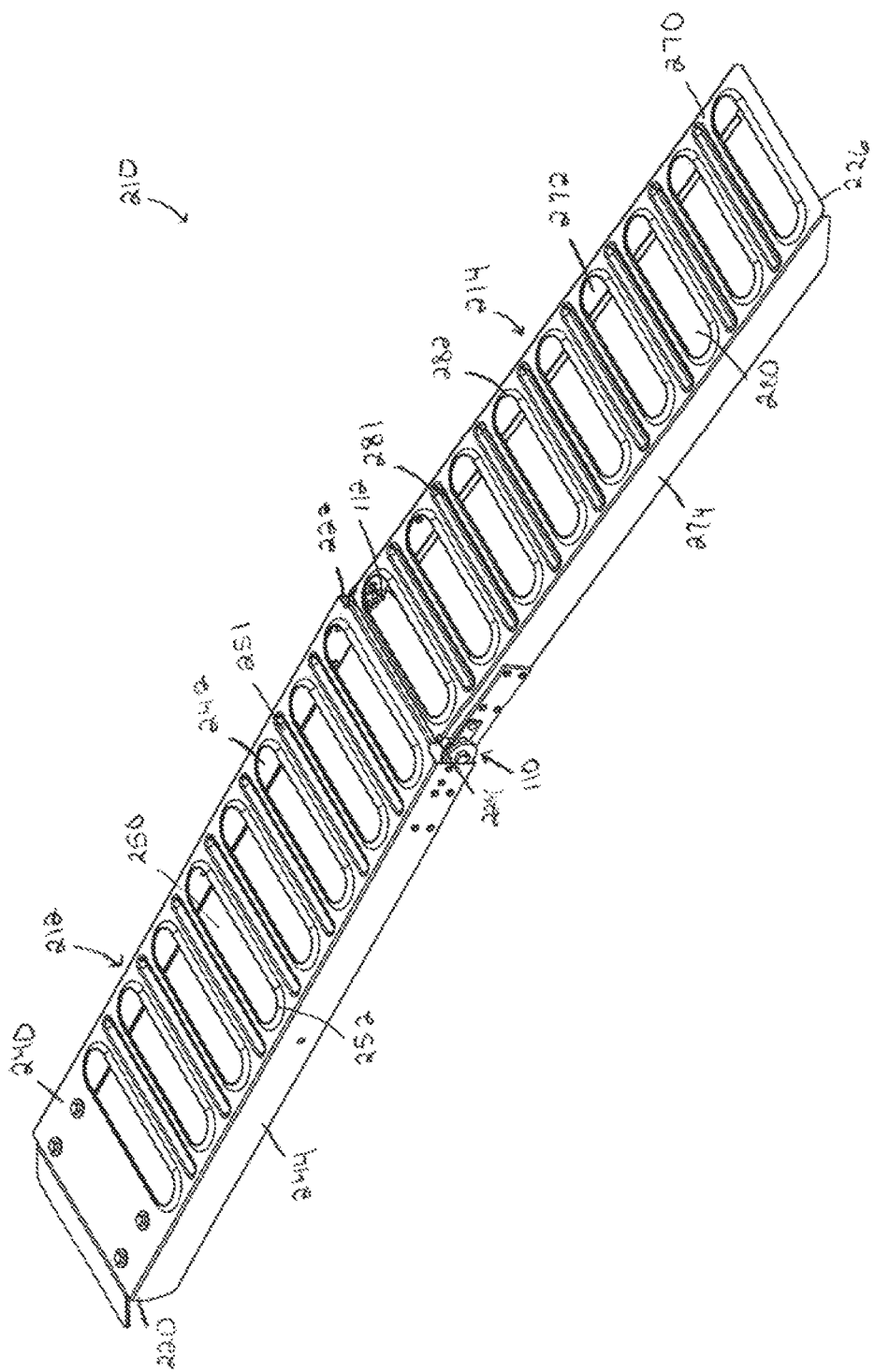
FIG. 24 is a perspective view of another exemplary loading ramp in an extended position.
Figure 25:
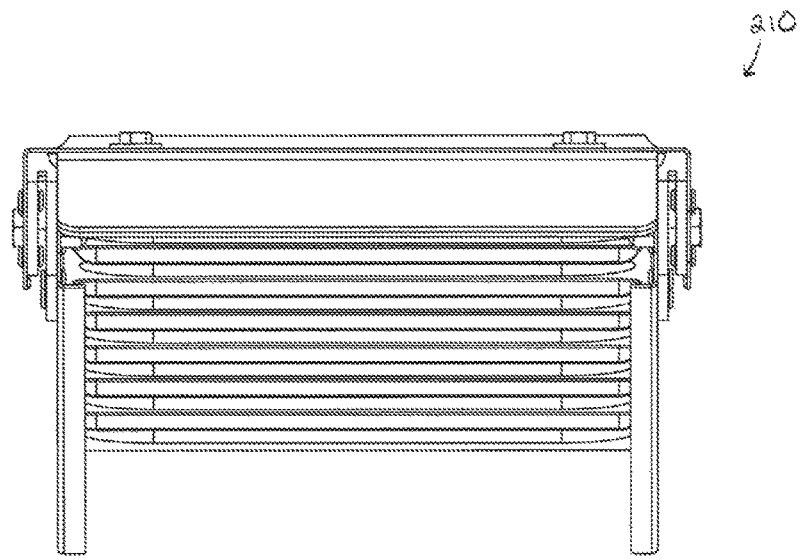
FIG. 25 is a front view of the loading ramp.
Figure 26:
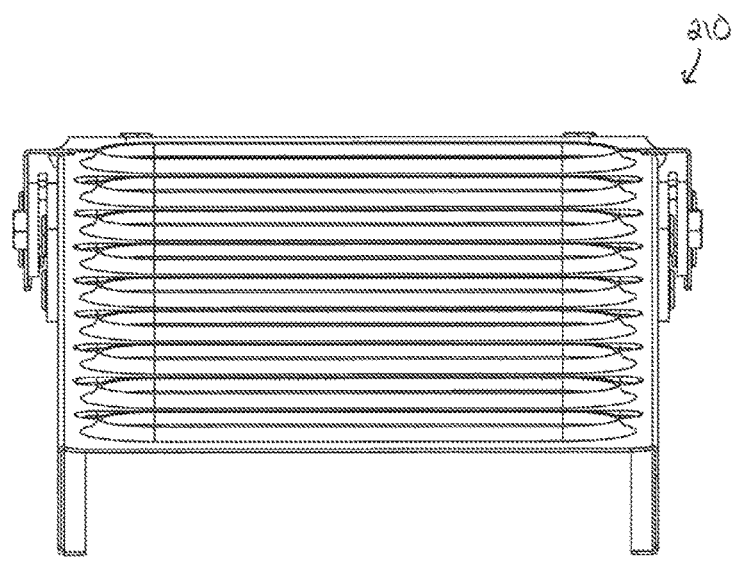
FIG. 26 is a rear view of the loading ramp.
Figure 27:
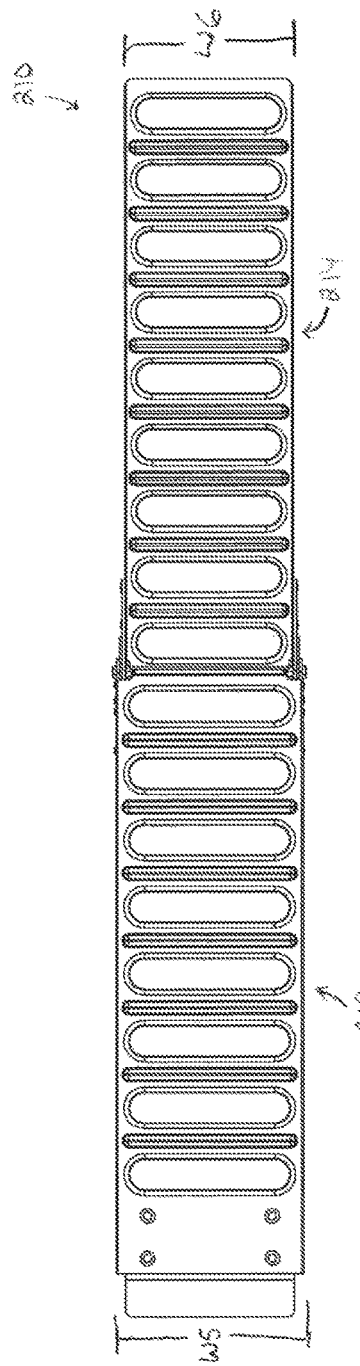
FIG. 27 is a top view of the loading ramp.
Figure 28:
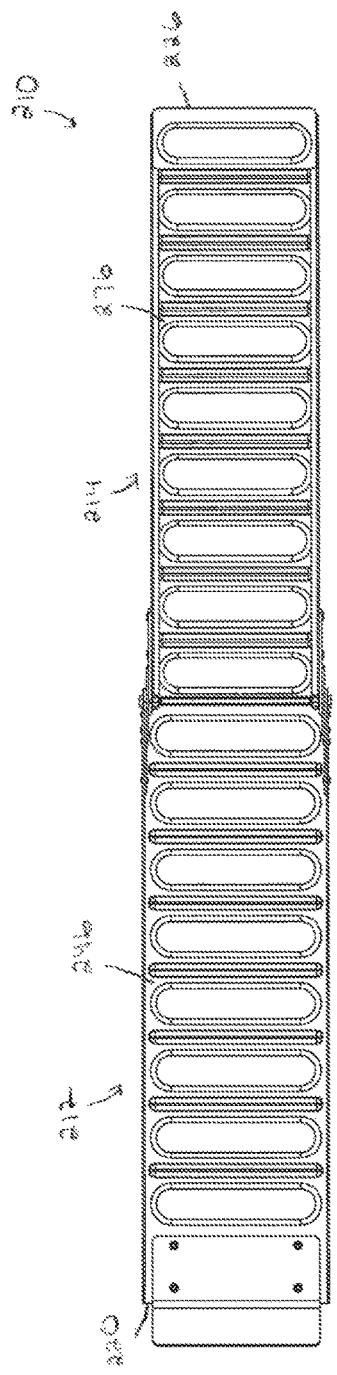
FIG. 28 is a bottom view of the loading ramp.

Turning now to FIGS. 15-21 in addition to FIG. 1, the first hinge assembly 110 is shown. The hinge assembly 112 shown in FIGS. 22 and 23 is the same as the hinge assembly 110 except a mirror image, and thus the following description and reference numerals is equally applicable to the hinge assembly 112. The hinge assembly 110 includes first and second plate members and a center stop 122. The first and second plate members may include first and second plates 114 and 116 respectively and first and second hinge stops 118 and 120 respectively. The first and second hinge plates 114 and 116 include a plurality of openings 124 and 126 respectively for receiving respective fasteners 128 and 130, such as rivets, to attach the first and second hinge plates 114 and 116 to one of the ramp portions. The heads of the fasteners 128 and 130 are thinner than a thickness of the center stop 122 to prevent interference during folding, and the openings 124 are located at different positions in the hinge plate 114 than the openings 126 in the hinge plate 116 to prevent the fasteners 128 and 130 from interfering with one another during folding.

The first and second hinge plates 114 and 116 also include a plurality of openings 132 and 134 respectively. The openings 132 are aligned with corresponding openings 136 in the first hinge stop 118 and the openings 134 are aligned with corresponding openings 138 in the second hinge stop 120. The aligned openings 132 and 136 receive fasteners 140, such as rivets, to couple the first hinge plate 114 to the first hinge stop 118 and the aligned openings 134 and 138 receive fasteners 142, such as rivets, to couple the second hinge plate 116 to the second hinge stop 120. A backside of the openings 136 and 138 may be countersunk as shown on the first hinge stop 118 to allow the fasteners 140 and 142 to be flush with the backside of the respective first and second hinge stop 118 and 120 to prevent interference during folding.

The first and second hinge plates 114 and 116 also include a respective opening 150, 152 that align with an opening 154 in the center stop 122. The aligned openings 150, 152, and 154 receive a fastener 156, such as a bolt, which serves as a pivot. A nut 158 is secured to the fastener 156 to couple the first and second hinge plates 114 and 116 and the center stop 122, and the center stop 122 can move about the axis of the fastener 156. In the extended position, the hinge plates 114 and 116 rotate about the pivot so that free ends of the hinge plates 114 and 116 opposite the ends near the pivot are spaced from one another, and in the nested position, the hinge plates 114 and 116 rotate about the pivot so that the free ends substantially overlap one another. As illustrated, the hinge plates rotate approximately one hundred eighty degrees.

To control the extended position of the ramp, the center stop 122 has opposing sides 160 and 162 that are angled from a top of the center stop towards a bottom of the center stop and configured to be contacted by respective ends 164 and 166 of the hinge stops 118 and 120. The interaction between the ends 164 and 166 of the hinge stops 118 and 120 and the center stop 122 prevents further extension of the ramp and holds the ramp in the extended position angled relative to one another. In the illustrated embodiment, the sides 160 and 162 have the same angle as one another although it will be appreciated that the opposing sides 160 and 162 may be parallel to one another allowing the ramp portions to be parallel to one another. It will also be appreciated that the opposing sides 160 and 162 of the center stops 122 for the first hinge assemblies 110 may have the same angles as one another as shown, or may have different angles to cause the first ramp portion 12 to be at a different angle from the second ramp portion 14 than the third ramp portion 16 is angled from the second ramp portion. It will also be appreciated that the opposing sides 160 and 162 may have different angles from one another.

Referring again to FIG. 1-3 in addition to FIGS. 15-23, one of the first hinge assemblies 110 is attached to the first and second ramp portions 12 and 14 to pivotally connect the first and second ramp portions 12 and 14 and the other of the first hinge assemblies 110 is attached to the second and third ramp portions 14 and 16 to pivotally connect the second and third ramp portions 14 and 16. One of the second hinge assemblies 112 is also attached to the first and second ramp portions 12 and 14 to pivotally connect the first and second ramp portions 12 and 14 and the other of the second hinge assemblies 112 is attached to the second and third ramp portions 14 and 16 to pivotally connect the second and third ramp portions 14 and 16.

As shown in FIG. 6, the first hinge plate 114 of one of the first hinge assemblies 110 is attached to an outer surface of the second side 74 of the second ramp portion 14 via the fasteners 128 and the second hinge plate 116 is attached to an inner surface of the second side 44 of the first ramp portion 12 via the fasteners 130. Similarly, the first hinge plate 114 of the other of the first hinge assemblies 110 is attached to an outer surface of the second side 94 of the third ramp portion 16 via the fasteners 128 and the second hinge plate 116 is attached to an inner surface of the second side 74 of the second ramp portion 14 via the fasteners 130.

As shown in FIG. 7, the first hinge plate 114 of one of the second hinge assemblies 112 is attached to an outer surface of the first side 72 of the second ramp portion 14 via the fasteners 128 and the second hinge plate 116 is attached to an inner surface of the first side 42 of the first ramp portion 12 via the fasteners 130. Similarly, the first hinge plate 114 of the other of the second hinge assemblies 112 is attached to an outer surface of the first side 92 of the third ramp portion 16 via the fasteners 128 and the second hinge plate 116 is attached to an inner surface of the first side 72 of the second ramp portion 14 via the fasteners 130.

To move the ramp 10 from the folded position to the extended position, the second and third ramp portions 14 and 16 are rotated out of the recessed space 46 and the third ramp portion 16 is rotated out of the recessed space 76. The ramp portions are rotated until the ends 164 and 166 of each of the hinge assemblies 110 and 112 contact the respective opposing sides 160 and 162 of the respective center stop 122 and pinch the center stop therebetween, thereby preventing further rotation of the ramp portions. The end plate 54 of the first ramp portion 12 can then be placed on the elevated surface and the angled ends of the first and second sides 92 and 94 of the third ramp portion 16 can be placed on the ground. A vehicle can then be moved up the ramp 10 from the ground to the elevated surface or down from the elevated surface to the ground.

The interaction between the hinge stops 118 and 120 and the center stop 122 of the hinge assemblies 110 and 112 causes the first and second ramp portions 12 and 14 to be angled or arched relative to one another and causes the second and third portions 14 and 16 to be angled or arched relative to one another. As illustrated, the angle between the first and second ramp portions 12 and 14 is the same as the angle between the second and third ramp portions 14 and 16. The angle of the ramp portions makes it easier for a vehicle with low clearance to move up and down the ramp 10.

To move the ramp 10 from the extended position to the folded position, the third ramp portion 16 is rotated into the recessed space 76, and then the second and third ramp portions 14 and 16 are rotated into the first recessed space 46.

Turning now to FIGS. 24-37, an exemplary embodiment of the loading ramp is shown at 210. The loading ramp 210 is substantially the same as the above-referenced loading ramp 10, and consequently the same reference numerals but indexed by 200 are used to denote structures corresponding to similar structures in the loading ramps. In addition, the foregoing description of the loading ramp 10 is equally applicable to the loading ramp 210 except as noted below. Moreover, the hinge assemblies of the loading ramp 210 are the same as the hinge assemblies of the loading ramp 10, and thus the description and reference numerals above apply equally.

Figure 38:
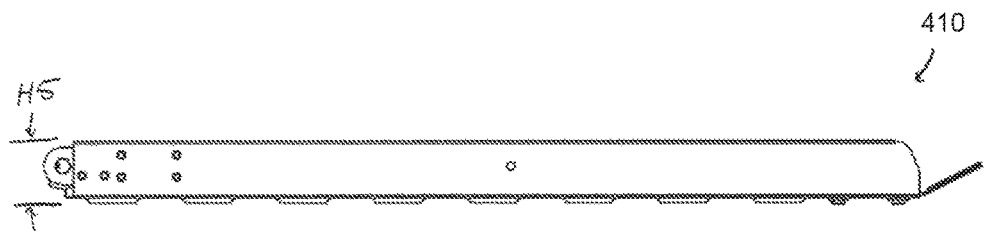
FIG. 38 is a left side view of another loading ramp in a folded position.
Figure 39:
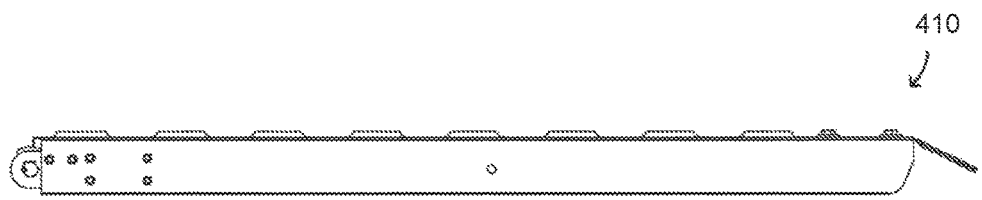
FIG. 39 is a right side view of the folding ramp of FIG. 38.
Figure 40:
FIG. 40 is a font view of the folding ramp of FIG. 38.

The loading ramp 210 is shown as a bi-fold ramp that includes a first ramp portion 212 and a second ramp portion 214 connected to the first ramp portion 212. Each ramp portion 212 and 214 has first and second ends 220 and 222, and 224 and 226, respectively, where the first end 224 of the second ramp portion 214 is adjacent the second end 222 of the first ramp portion 212. The first ramp portion 212 has a first width W5 and a first height H5 and the second ramp portion 214 has a second width W6 less than the first width W5 and a second height H6. In an embodiment, the second height H6 is less than or equal to the first height H5. In another embodiment of a ramp 410, as shown in FIGS. 38-40, which is substantially the same as the ramp 210 and thus the same reference numbers and description are equally applicable except as noted below, the second ramp portion 214 is completely disposed within the recessed space 246 such that the combined height H7 is equal to the first height H5.

The first ramp portion 212 includes a deck 240 and first and second sides 242 and 244 that may be integrally formed and form a recessed space 246 for receiving the second ramp portion 214. The deck 240 includes one or more openings 250 that may have any suitable shape, such as a pill shape, and which each have an upward extending ridge 252 that acts as a friction element. Spaced between the opening 250 are recessed portions 251 that provides strength to the deck 240.

Similar to the first ramp portions 212, the second ramp portion 214 includes a deck 270 and first and second sides 272 and 274 that may be integrally formed and form a recessed space 276. The ends of the first and second sides 272 and 274 may be angled at the second end 226 to rest against the second surface. The deck 270 includes one or more openings 280 that may have any suitable shape, such as a pill shape, and which each have an upward extending ridge 282 that acts as a friction element. Spaced between the opening 280 are recessed portions 281 that provide strength to the deck 270.

The first ramp portion 212 is connected to the second ramp portion 214 by the first and second hinge assemblies 110 and 112. When extended, the ramp portions 212 and 214 are angled relative to one another or substantially coplanar to one another. When nested, a combined height H7 of the ramp portions 212 and 214 will be similar to the height H5 of the first ramp portion. For example, when nested, the combined height H7 is greater than the first height H5 and less than one and one fourth the first height H5.

Figure 29:
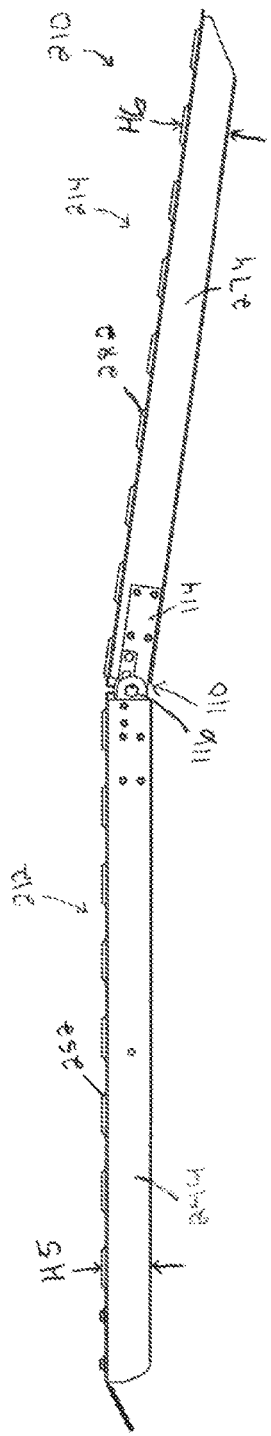
FIG. 29 is a left side view of the loading ramp.
Figure 30:
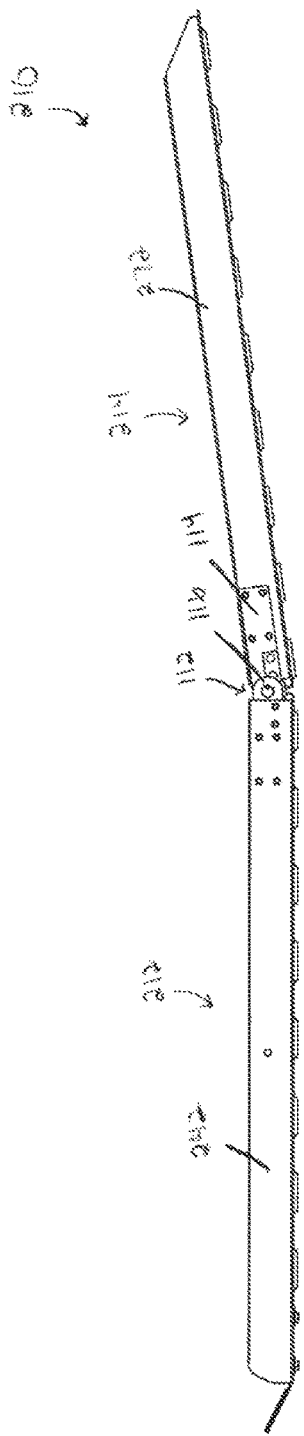
FIG. 30 is a right side view of the loading ramp.
Figure 31:
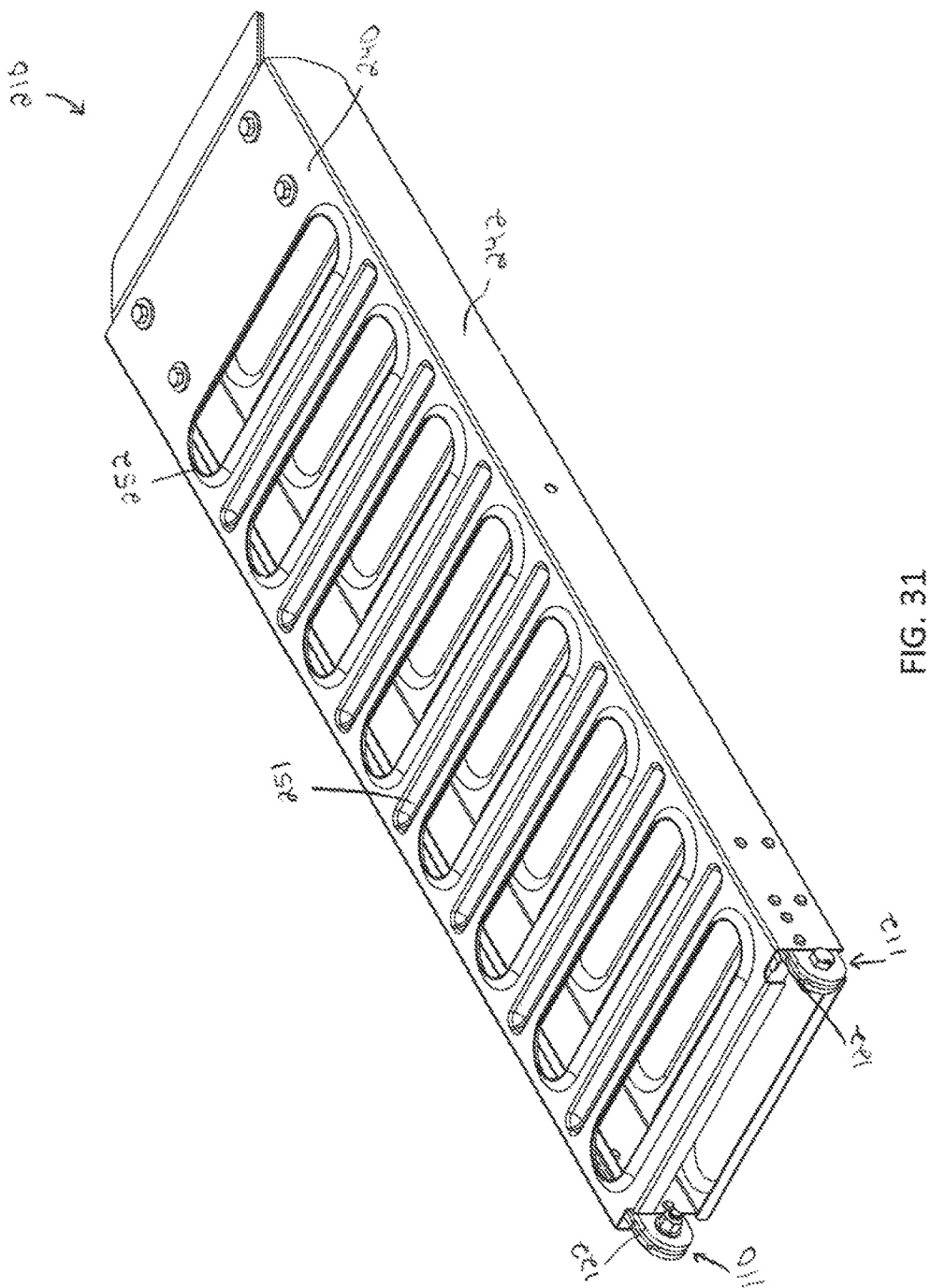
FIG. 31 is a perspective view of the loading ramp in a folded position.
Figure 32:
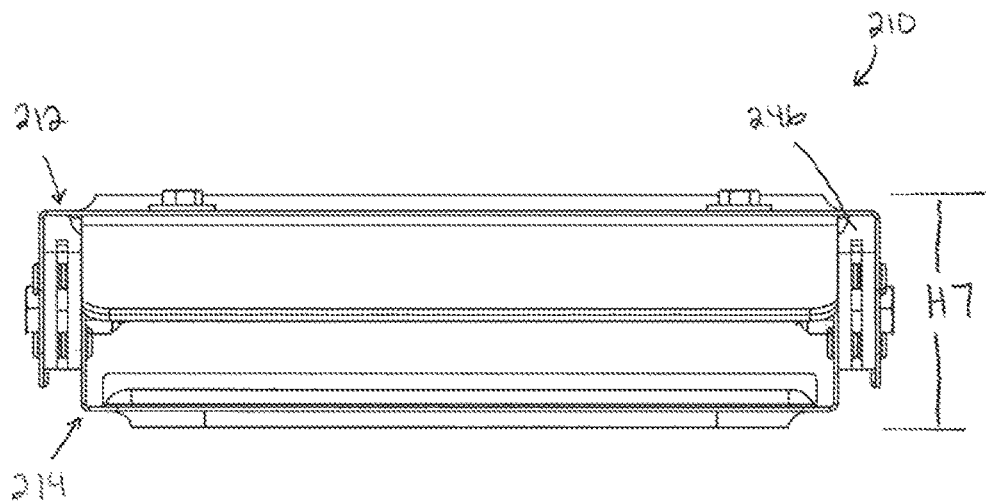
FIG. 32 is a front view of the loading ramp.
Figure 33:
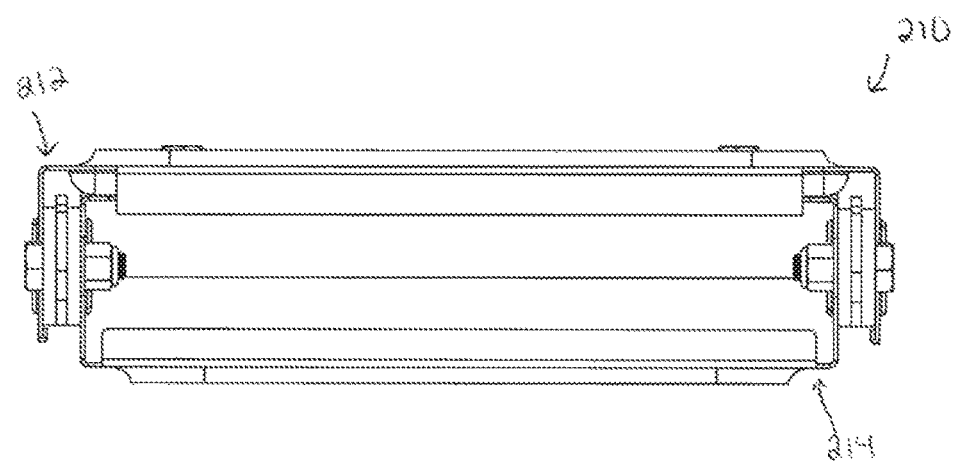
FIG. 33 is a rear view of the loading ramp.
Figure 34:
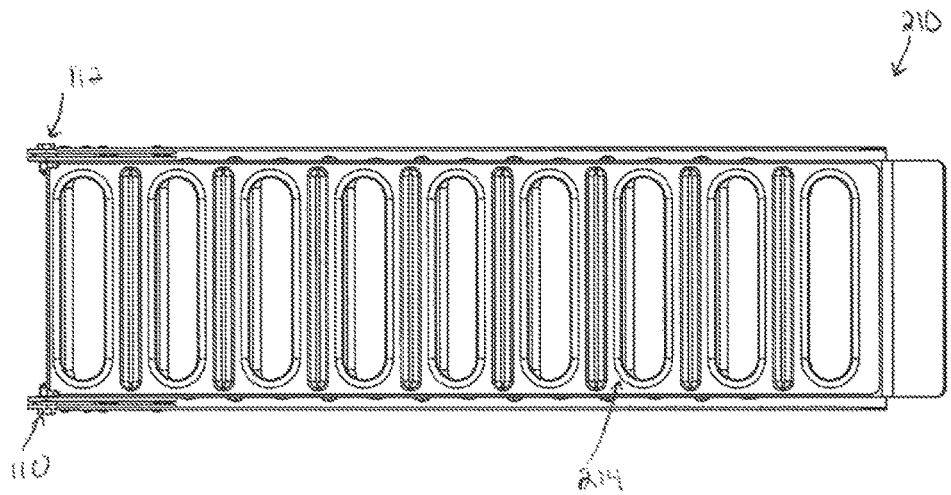
FIG. 34 is a bottom view of the loading ramp.
Figure 35:
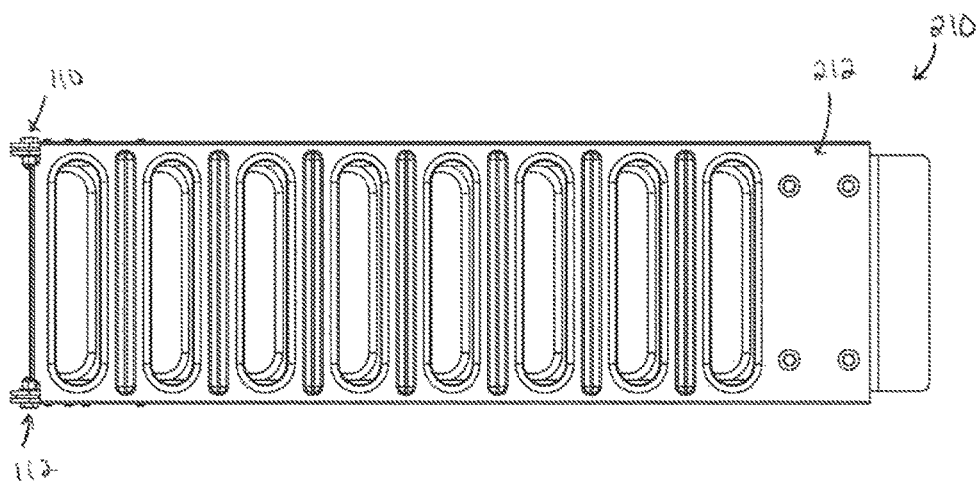
FIG. 35 is a top view of the loading ramp.
Figure 36:
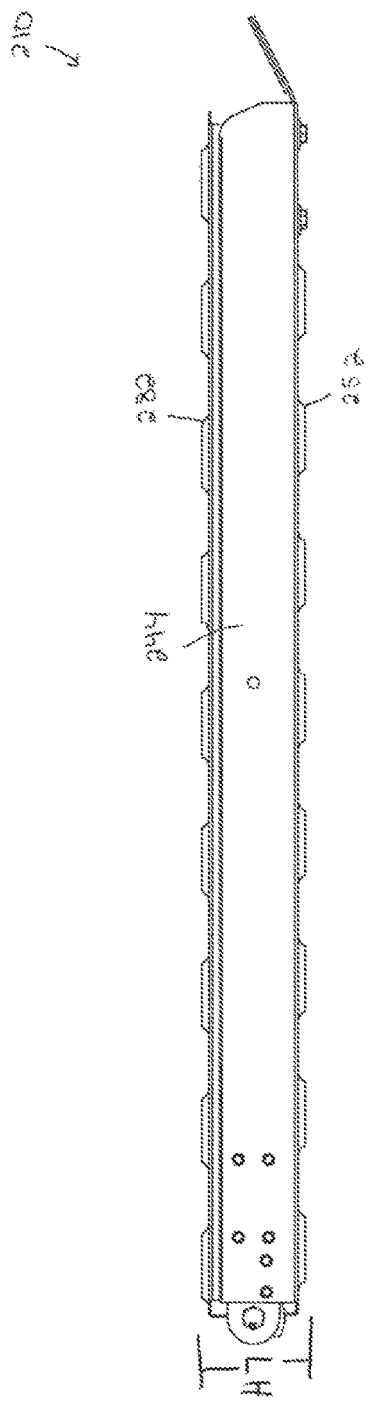
FIG. 36 is a left side view of the loading ramp.
Figure 37:
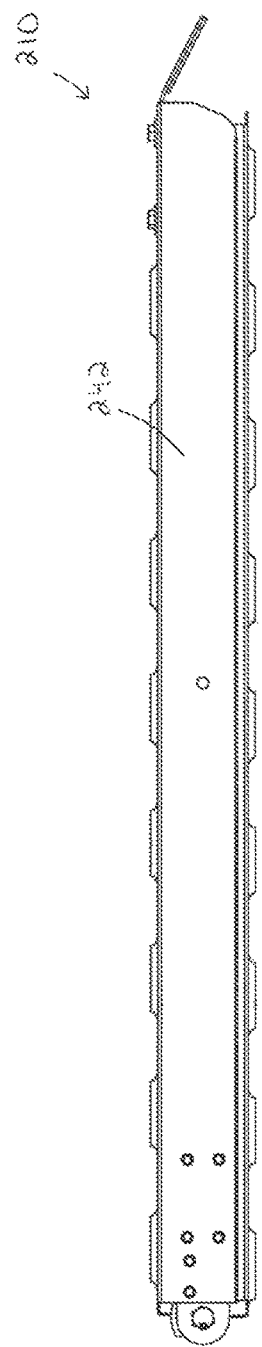
FIG. 37 is a right side view of the loading ramp.

As shown in FIG. 29, the first hinge plate 114 of one of the first hinge assemblies 110 is attached to an outer surface of the second side 274 of the second ramp portion 214 via the fasteners 128 and the second hinge plate 116 is attached to an inner surface of the second side 244 of the first ramp portion 212 via the fasteners 130. As shown in FIG. 30, the first hinge plate 114 of one of the second hinge assemblies 112 is attached to an outer surface of the first side 272 of the second ramp portion 214 via the fasteners 128 and the second hinge plate 116 is attached to an inner surface of the first side 242 of the first ramp portion 212 via the fasteners 130.

Although certain embodiments have been shown and described, it is understood that equivalents and modifications falling within the scope of the appended claims will occur to others who are skilled in the art upon the reading and understanding of this specification.

What is claimed is:

1. A loading ramp including: a first ramp portion having first and second ends and a first width, the first ramp portion having a first side and a second side defining a first recessed space therein; a second ramp portion having first and second ends and a second width less than the first width, the second ramp portion having a first side and a second side defining a second recessed space therein; and first and second hinge assemblies pivotally connecting the first and second ramp portions, each hinge assembly including a first hinge plate having a first end attached to an outer surface of one of the first or second sides of the second ramp portion at the first end of the second ramp portion, a second hinge plate having a first end attached to an inner surface of an adjacent one of the first or second sides of the first ramp portion at the second end of the first ramp portion, and a pivot connecting the respective first and second hinge plates at second ends of the first and second hinge plate assemblies, wherein the loading ramp has an extended position and a folded position where the second ramp portion is nested within the first ramp portion such that the second ramp portion is disposed in the first recessed space.

2. The loading ramp according to claim 1, wherein the first and second hinge assemblies each additionally include first and second hinge stops coupled to the first and second hinge plates respectively, and a center stop between the first and second hinge plates that is held therebetween by the pivot.

3. The loading ramp according to claim 2, wherein each center stop includes first and second opposing sides, and wherein the first opposing side of each center stop is configured to be contacted by an end of the respective first hinge stop in the extended position and the second opposing side of each center stop is configured to be contacted by an end of the respective second hinge stop in the extended position to serve as a stop to prevent further extension of the loading ramp.

4. The loading ramp according to claim 3, wherein the first and second opposing sides are angled such that the first and second ramp portions are angled relative to one another in the extended position.

5. The loading ramp according to claim 1, wherein the first ramp portion has a first height, and wherein in the folded position the first and second ramp portions have a combined height greater than the first height and less than one and one third the first height.

6. The loading ramp according to claim 1, further including a third ramp portion having first and second ends and a third width less than the second width, and third and fourth hinge assemblies each coupled to the second ramp portion at the second end and to the third ramp portion at the first end to pivotally connect the second ramp portion and the third ramp portion.

7. The loading ramp according to claim 6, wherein in the folded position the third ramp portion is nested within the second ramp portion such that the third ramp portion is disposed in the second recessed space, and the second and third ramp portions are nested within the first ramp portion such that the second and third ramp portions are disposed in the first recessed space.

8. The loading ramp according to claim 7, wherein the first ramp portion has a first height, and wherein in the folded position the first, second, and third ramp portions have a combined height greater than the first height and less than one and one third the first height.

9. The loading ramp according to claim 6, wherein the first and second hinge assemblies each include a first hinge plate attached to the second ramp portion, a second hinge plate attached to the first ramp portion, a pivot connecting the first and second hinge plates, first and second hinge stops coupled to the first and second hinge plates respectively, and a center stop between the first and second hinge plates that is held therebetween by the pivot, and wherein the third and fourth hinge assemblies each include a third hinge plate attached to the third ramp portion, a fourth hinge plate attached to the second ramp portion, a pivot connecting the third and fourth hinge plates, third and fourth hinge stops coupled to the third and fourth hinge plates respectively, and a center stop between the third and fourth hinge plates that is held therebetween by the pivot.

10. The loading ramp according to claim 9, wherein each center stop includes first and second opposing sides, and wherein the first opposing side of the center stops of the first and second hinge assemblies is configured to be contacted by an end of the respective first hinge stop in the extended position, the second opposing side of the center stops of the first and second hinge assemblies is configured to be contacted by an end of the respective second hinge stop in the extended position, the first opposing side of the center stops of the third and fourth hinge assemblies is configured to be contacted by an end of the respective third hinge stop in the extended position, and the second opposing side of the center stops of the third and fourth hinge assemblies is configured to be contacted by an end of the respective fourth hinge stop in the extended position to serve as a stop to prevent further extension of the loading ramp.

11. The loading ramp according to claim 10, wherein the first and second opposing sides are angled such that the first and second ramp portions are angled relative to one another in the extended position and such that the second and third ramp portions are angled relative to one another in the extended position.

12. The loading ramp according to claim 1, wherein in the folded position the first end of each of the first hinge plates is adjacent to the first end of the respective second hinge plate such the first and second hinge plates of each hinge assembly overlap one another.

13. The loading ramp according to claim 12, wherein the first ramp portion has a first height, and wherein in the folded position the first and second ramp portions have a combined height greater than the first height and less than one and one third the first height.

14. The loading ramp according to claim 13, wherein the first and second hinge plates each have a height less than the first height.

15. A loading ramp including: a first ramp portion having a first width, and a first side and a second side defining a first recessed space therein; a second ramp portion having a second width less than the first width and a first side and a second side defining a second recessed space therein; a third ramp portion having a third width less than the second width and a first side and a second side and defining a third recessed space therein; first and second hinge assemblies each including a first plate member having a first end attached to one of the first or second side of the second ramp portion and a second end, a second plate member having a first end attached to one of the first or second sides of the adjacent first ramp portion and a second end, and a pivot connecting the first and second plate members at the second ends; and third and fourth hinge assemblies each including a third plate member having a first end attached to one of the first or second sides of the third ramp portion and a second end, a fourth plate member having a first end attached to a first or second side of the adjacent second ramp portion and a second end, and a pivot connecting the third and fourth plate members at the second ends, wherein the loading ramp has an extended position and a folded position where the third ramp portion is nested within the second ramp portion such that the third ramp portion is disposed in the second recessed space, and the second and third ramp portions are nested within the first ramp portion such that the second and third ramp portions are disposed in the first recessed space, and wherein in the folded position the first end of each of the first plate members is adjacent to the first end of the respective second plate member such that the first and second plate members of each of the first and second hinge assemblies overlap one another, and the first end of each of the third plate members is adjacent to the first end of the respective fourth plate member such that the third and fourth plate members of each of the third and fourth hinge assemblies overlap one another.

16. The loading ramp according to claim 15, wherein each hinge assembly includes a center stop between the respective plate members that is held between the respective plate members by the respective pivot, and wherein each center stop includes first and second opposing sides configured to be contacted by an end of the respective plate member to serve as a stop to prevent further extension of the loading ramp in the extended position.

17. The loading ramp according to claim 15, wherein the first ramp portion has a first height, and wherein in the folded position the first, second, and third ramp portions have a combined height greater than the first height and less than one and one third the first height.

18. The loading ramp according to claim 17, wherein in the folded position the first, second, third, and fourth hinge assemblies each have a height less than the first height.

19. A loading ramp including: a first ramp portion having a first width, a first height, and first and second sides defining a first recessed space therein; a second ramp portion pivotally coupled to the first ramp portion and having a second width less than the first width and first and second sides defining a second recessed space therein; first and second hinge assemblies pivotally connecting the first and second ramp portions, each hinge assembly including a first hinge plate having a first end attached to an outer surface of one of the first or second sides of the second ramp portion at the first end of the second ramp portion, a second hinge plate having a first end attached to an inner surface of an adjacent one of the first or second sides of the first ramp portion at the second end of the first ramp portion; and a third ramp portion pivotally coupled to the second ramp portion and having a third width less than the second width and having first and second sides defining a third recessed space therein; and third and fourth hinge assemblies each including a third plate member having a first end attached to one of the first or second sides of the third ramp portion and a second end, a fourth plate member having a first end attached to a first or second side of the adjacent second ramp portion and a second end; wherein the loading ramp has an extended position and a folded position where the third ramp portion is nested within the second ramp portion such that the third ramp portion is disposed in the second recessed space, and the second and third ramp portions are nested within the first ramp portion such that the second and third ramp portions are disposed in the first recessed space, wherein in the folded position the first, second, and third ramp portions have a combined height greater than the first height and less than one and one third the first height.

20. The loading ramp according to claim 19, wherein the first ramp portion has a first height, and wherein in the folded position the first, second, and third ramp portions have a combined height equal to the first height.

\* \* \* \* \*